(12) United States Patent
Sbisa et al.

(10) Patent No.: US 6,920,214 B1
(45) Date of Patent: Jul. 19, 2005

(54) TELECOMMUNICATIONS SYSTEM WITH CENTRALIZED CALL REDIRECTION CONTROL LOGIC AND SPEED DIAL TRANSLATION LOGIC

(75) Inventors: Daniel Charles Sbisa, Blue Springs, MO (US); Kevin Stueve, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/345,936

(22) Filed: Jul. 1, 1999

(51) Int. Cl.[7] ............................................. H04M 3/00
(52) U.S. Cl. ............................ 379/221.08; 379/221.09
(58) Field of Search ...................... 379/221.08, 221.09, 379/216.01, 355.02, 355.03, 355.04

(56) References Cited

U.S. PATENT DOCUMENTS

| | | | |
|---|---|---|---|
| 5,526,413 A | | 6/1996 | Cheston, III et al. |
| 5,694,463 A | | 12/1997 | Christie et al. |
| 5,757,899 A | * | 5/1998 | Boulware et al. ...... 379/207.03 |
| 5,768,360 A | * | 6/1998 | Reynolds et al. ...... 379/220.01 |
| 5,771,279 A | | 6/1998 | Cheston, III et al. |
| 5,793,853 A | | 8/1998 | Sbisa |
| 5,835,584 A | | 11/1998 | Penttonen |
| 5,915,008 A | * | 6/1999 | Dulman .................. 379/221.08 |
| 6,072,864 A | * | 6/2000 | Shtivelmann et al. ....... 379/210 |
| 6,374,102 B1 | * | 4/2002 | Brachman et al. .......... 455/422 |

OTHER PUBLICATIONS

Newton's Telecomm Dictionary, Harry Newton, 1998, p. 642.*
Briere, Daniel, ""Sprint plans 'sweeping' network revisions", " Network World, vol. 10 (No. 38), p. 1 and 10, (Sep. 20, 1993).
U.S. Appl. No. 08/842,384, filed Apr. 23, 1997.
U.S. Appl. No. 09/063,902, filed Apr. 21, 1998.
U.S. Appl. No. 09/276,290, filed Dec. 7, 1995.
U.S. Appl. No. 08/988,909, filed Dec. 11, 1997.
U.S. Appl. No. 09/324,277, filed Jun. 2, 1999.
U.S. Appl. No. 09/346,758, filed Jul. 1, 1999.
U.S. Appl. No. 09/368,812, filed Aug. 5, 1999.
U.S. Appl. No. 09/368,811, filed Aug. 5, 1999.
U.S. Appl. No. 09/368,797, filed Aug. 5, 1999.

* cited by examiner

Primary Examiner—William J. Deane, Jr.

(57) ABSTRACT

A telecommunications system comprising a service control point having call redirection logic and speed dial translation logic and a switching system connected to the service control point. The service control point is configured to receive a first message and process the first message to generate a second message containing first call handling information for a call, receive a third message that includes a first speed dial number and process the third message to generate a fourth message with second call handling information for the call. The switching system is configured to transmit the first message and the third message for the SCP and receive the second message and the fourth message from the SCP.

20 Claims, 7 Drawing Sheets

TELECOMMUNICATIONS SYSTEM WITH CENTRALIZED CALL REDIRECTION CONTROL LOGIC AND SPEED DIAL TRANSLATION LOGIC

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to a telecommunications system, and specifically, to a telecommunications service control point (SCP) having call redirection control logic and speed dial translation processing logic.

2. Description of the Prior Art

In a telecommunications network, an SCP provides service information to devices in the network using call processing applications within the SCP. Some examples of service information provided by the SCP include special service number routing information and calling card information. For instance, a switch receives a call requiring a special service to complete the call to a called destination. Recognizing the need for a service, the switch transmits a query message to the SCP. The SCP processes the query message and returns a response message containing service information for the call. These query and response messages are generally Signaling System #7 (SS7) Transaction Capabilities Application Part (TCAP) protocol messages that are well known in the art.

Unfortunately, SCP architectures and operation do not effectively support call redirection services or speed dial translation processing, which is commonly used to initiate call redirection. Presently, call redirection control logic is included in communication devices that also include the call connection capabilities to redirect the call. In addition, speed dial translation processing is also located in the communication devices having call redirection control logic and connection capabilities. One example of such a communication device is a telecommunications switch.

In an example of call redirection, a call is received in a switch having call redirection control logic and call connection capabilities. The call is then connected between the caller and a first called party. Where the first called party has subscribed to a call redirection service, the call can be redirected by a caller-entered command, such as a speed dial number. The switch processes the speed dial using internal redirection and translation processing logic and extends the call to a second called party.

SUMMARY OF THE INVENTION

The present invention advances the art by providing an SCP configured with call redirection control logic and speed dial translation processing logic. The SCP is configured to process messages including speed dial numbers to generate call routing and call redirection handling information for calls. Advantageously, the call redirection control logic is centralized within the SCP. In addition, the speed dial translation and call redirection logic are interfaced with other call processing applications allowing for the construction and homogeneous integration of new services in the SCP that utilize the speed dial translation and call redirection logic.

The present telecommunications system comprises SCP and switching system connected to the SCP. The SCP is configured to receive a first message and process the first message to generate a second message containing first call handling information for a call, receive a third message that includes a first speed dial number and process the third message to generate a fourth message with second call handling information for the call. The switching system is configured to transmit the first message and the third message for the SCP and receive the second message and the fourth message from the SCP. In the context of this application a speed dial number is defined as five or less touch tone characters. The touch tone characters could be five or less digits or a combination of digits and other characters including without limitation, the asterisk character and/or the octothorpe character.

DETAILED DESCRIPTION OF THE PREFERRED EMBODIMENT

Figure 1:
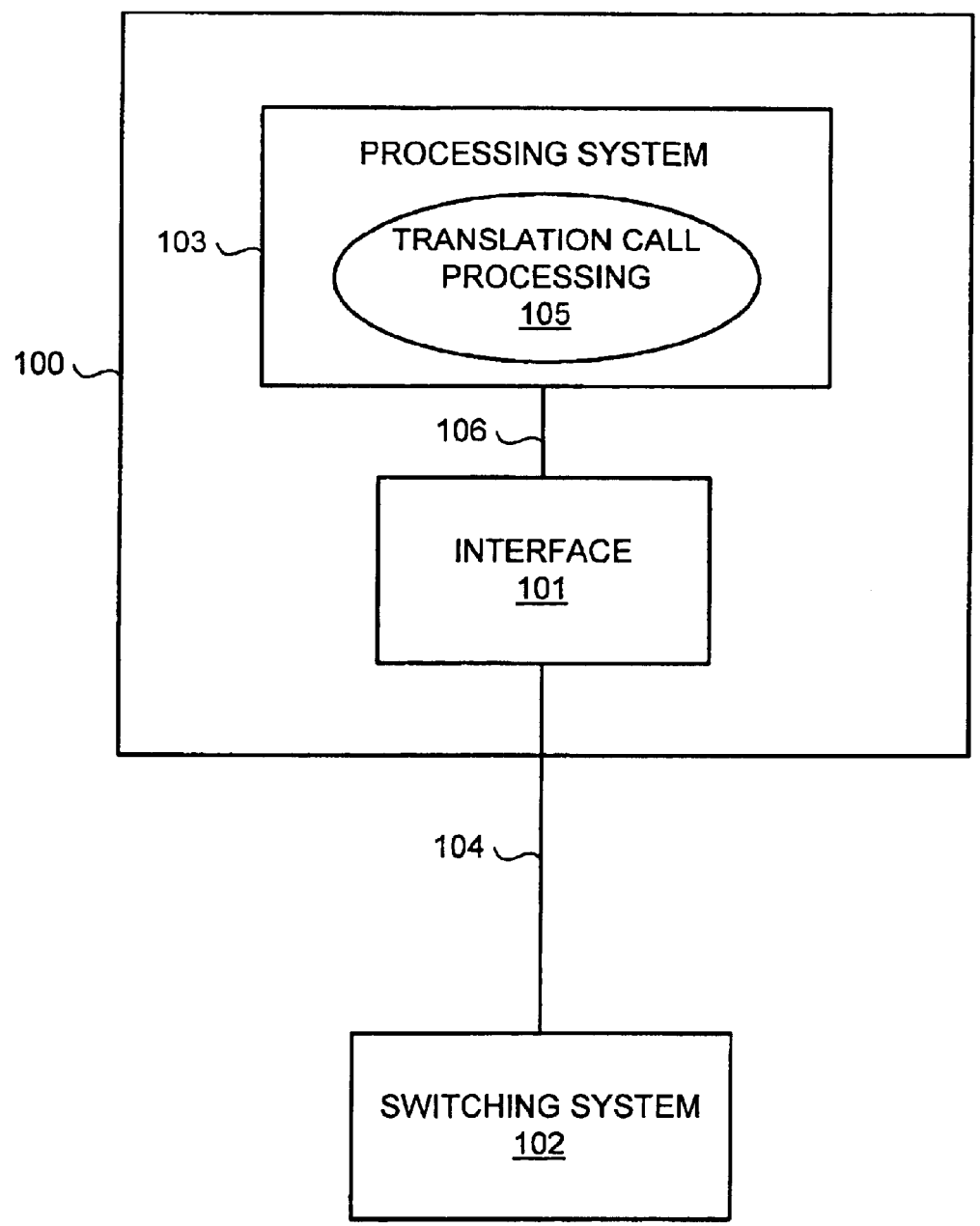
FIG. 1 illustrates a system architecture in an example of the present invention.

FIG. 1 depicts SCP 100 and switching system 102. SCP 100 comprises processing system 103 and interface 101. Processing system 103 comprises translation call processing application 105. One skilled in the art will appreciate that processing system 103 would include other call processing applications although only translation call processing application 105 is shown for clarity. Switching system 102 is connected to interface 101 by link 104. One example of switching system 102 could be one or more telecommunications switches commonly known and used in the art. Link 104 could be any link capable of exchanging messages between interface 101 and switching system 102. Interface 101 is connected to processing system 103 by link 106. Link 106 could be any link capable of exchanging messages between interface 101 and processing system 103.

Processing system 103 could be any processing system capable of: 1) processing a first message to generate a second message containing first call handling information for a call, and 2) process a third message containing a speed dial number to generate a fourth message with second call handling information for the call. Processing system 103 uses translation call processing application 105 for translation and processing of the speed dial number. It should be noted that in the context of this application, the first, second, third, fourth, etc. connotations used to reference the messages are used solely for the purpose of differentiating between different messages and are not used to indicate a message sequence or processing sequence.

Interface 101 could be any interface capable of: 1) receiving the first message from switching system 102, 2) transmitting the second message with the first call handling instructions for switching system 102, 3) receiving the third message with the speed dial instruction from switching system 102, and 4) transmitting the fourth message with the second call handling information for switching system 102.

Figure 2:
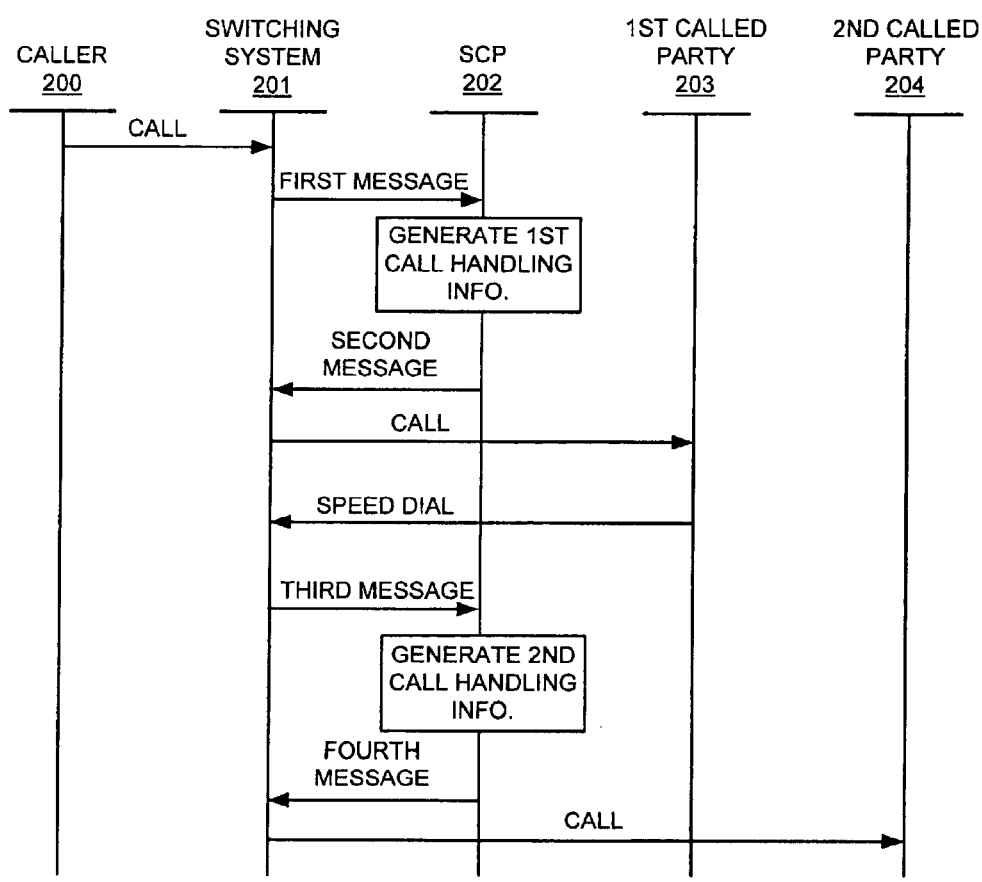
FIG. 2 illustrates a message sequence diagram for a call redirection in an example of the invention.

FIG. 2 depicts a message sequence chart for a call redirection using an SCP 202 in an example of the present invention, but those skilled in the art will recognize numerous other configurations that are applicable to the invention described above. Those skilled in the art will also appreciate how combinations of features described below can be combined with the above-described embodiment.

In FIG. 2 the caller 200 places a call to a first called party 203. The call is received by a switching system 201, which generates a first message for SCP 202 to obtain call handling information. SCP 202 processes the first message to generate a second message containing first call handling information for the call and transmits the second message for switching system 201. Switching system 201 uses the first call handling information to extend the call to a first called party 203. First called party 203 then enters a speed dial number that instructs switching system 201 to redirect the call to a second called party 204. Switching system 201 generates a third message for SCP 202 that includes the speed dial number to obtain call handling information for the call. SCP 202 processes the third message with the speed dial number to generate a fourth message with second call handling information for the call and transmits the fourth message to switching system 201. The second call handling information causes switching system 201 to extend the call to a second called party 204.

Upon extending the call to the second called party 204, several options for call connection are available. One option is to connect caller 200, first called party 203 and second called party 204 in a conferenced conversation. Another option is to place caller 200 on hold while first called party 203 and second called party 204 converse in conversation. Yet another option, is to disconnect first called party 203 wherein caller 200 and second called party 204 converse in conversation.

Figure 3:
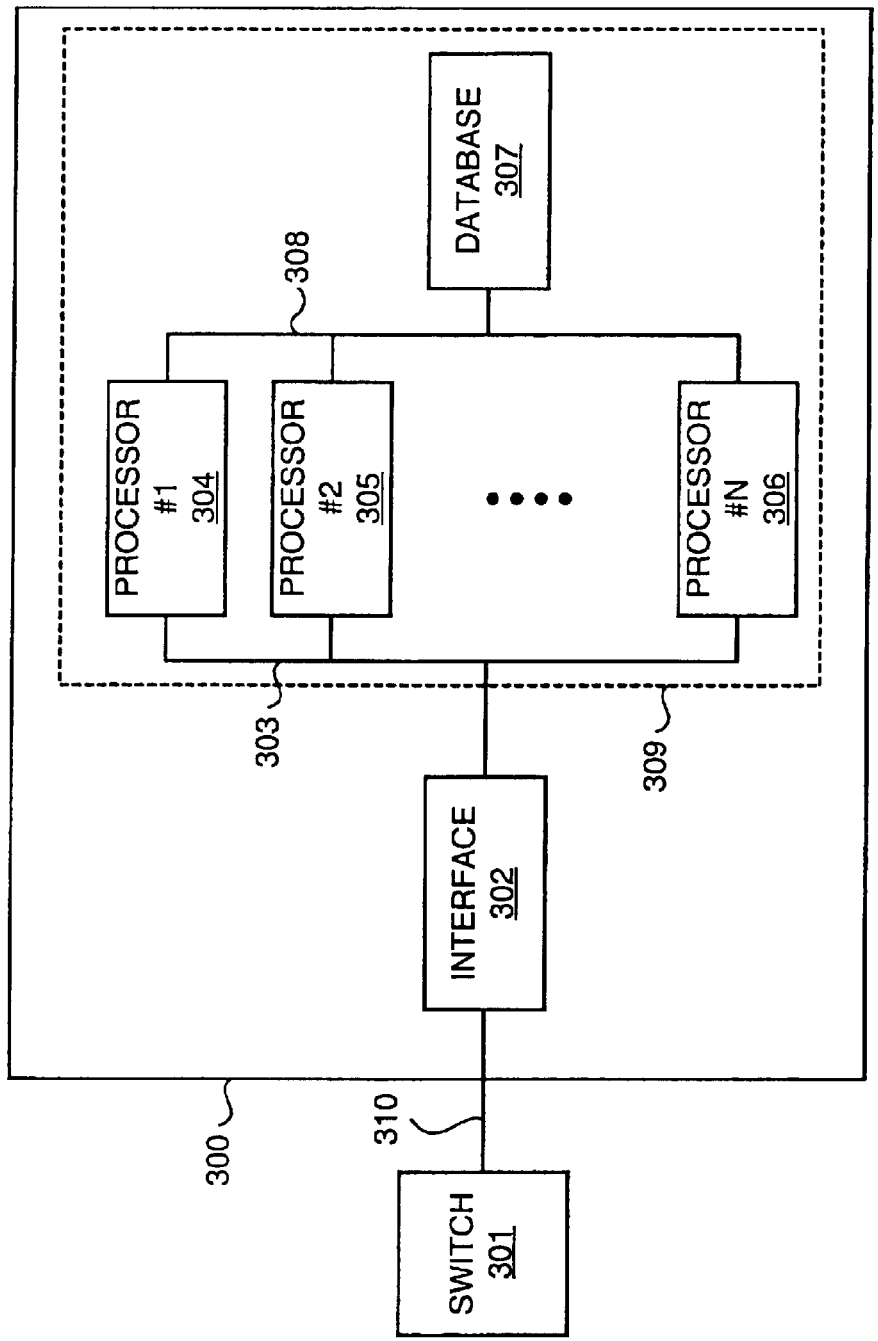
FIG. 3 illustrates an SCP architecture in an example of the present invention.

SCP Architecture and Operation:

FIG. 3 depicts an SCP architecture and a switch in an example of the present invention, but those skilled in the art will recognize numerous other configurations that are applicable to the invention described above. Those skilled in the art will also appreciate how combinations of features described below can be combined with the above-described embodiment.

FIG. 3 depicts SCP 300 and switch 301. SCP 300 comprises processing system 309, links 303 and 308, and interface 302. Processing system 309 comprises central processing units (CPUs) 304, 305 and 306 and database 307. As those skilled in the art are aware, a processing system can be comprised of a single CPU or can be distributed across multiple CPUs. Multiple CPUs are depicted in FIG. 3 although only CPUs 304, 305, and 306 are shown for clarity. Switch 301 could be a communication switch capable of conforming to the interface message rules for interacting with SCP 300. One example of switch 301 is a DMS-250 available from Nortel, and modified in accordance with the present invention.

Interface 302 is connected to CPUs 304, 305 and 306 by link 303. Database 307 is connected to CPUs 304, 305 and 306 by link 308. Switch 301 is connected to interface 302 by link 310. Link 310 could be any link capable of exchanging messages between interface 302 and switch 301. One example of link 310 could be a link having SS7 message transfer part functionality and SS7 signaling connection control part functionality that is known in the art. Although they are not shown for clarity, interface 302 could handle numerous such links to other elements in a telecommunications network.

Processing system 103 could be any processing system where one of CPUs 304, 305 or 306 is capable of: 1) processing a first message that includes a speed dial number to generate a second message containing call handling information for a call. Although the call handling information can include other instructions, it is typically routing information to one or more switches in the network and connection to a call destination. CPUs 304, 305 and 306 access database 307 to support call processing. An example of processing system 309 including CPUs 304, 305 and 306, link 308, and database 307 is the Tandem Himalaya loaded with the Tandem Guardian operating system, in addition to database management software and various conventional utilities. Link 303 could be any link for interfacing processors and exchanging messages between interface 302 and processors 304, 305 and 306. Link 308 could be any link for interfacing processors and exchanging messages between database 307 and processors 304, 305 and 306.

Interface 302 could be any interface capable of receiving a first message with a speed dial number and transmitting a second message with call handling information for switch 301. An example of interface 302 could be an interface configured to receive multiple messages in multiple protocols and provide access to processing system 309.

Figure 4:
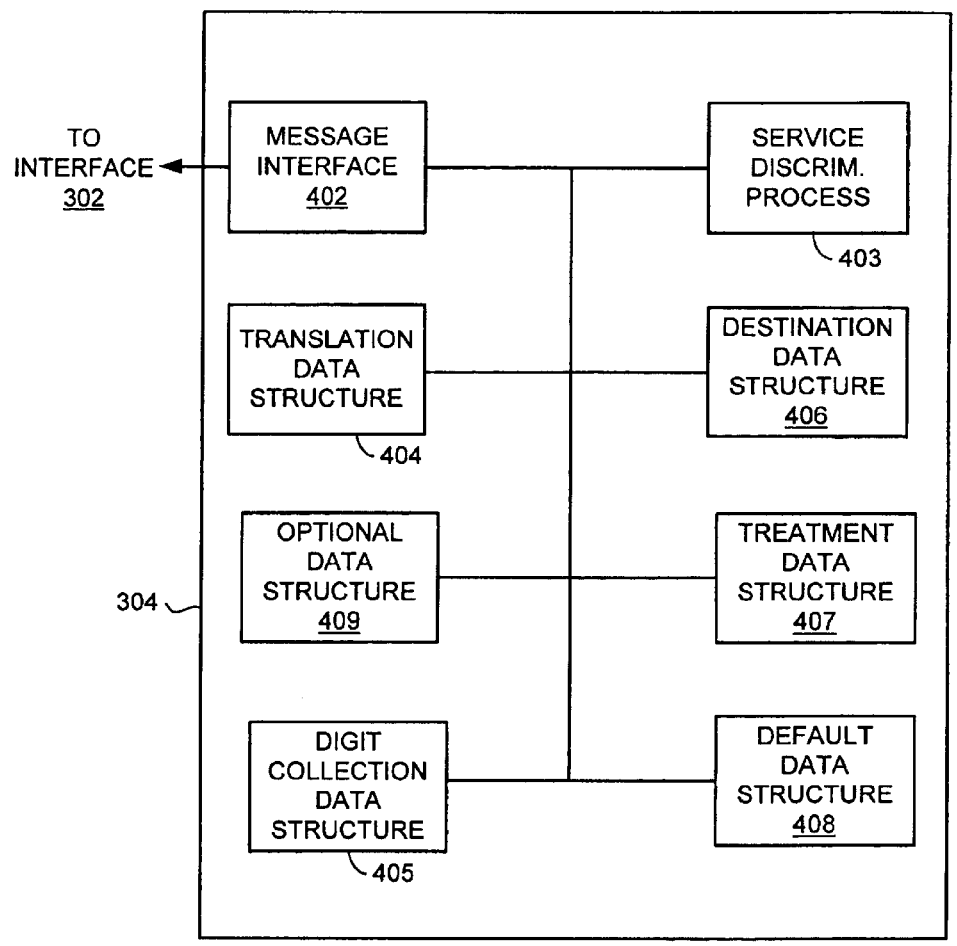
FIG. 4 illustrates a call processing architecture in an example of the present invention.

FIG. 4 illustrates the operation of the processing logic in CPU 304 of SCP 300 in some embodiments of the invention. The processing logic in other CPUs would be similar. Those skilled in the art will appreciate that numerous other configurations of the processing logic can be derived from the following example that are within the scope of the invention. Those skilled in the art will also appreciate how the principles illustrated in this example can be used in other examples of the invention.

FIG. 4 depicts CPU 304, which includes message interface 402, service discrimination process 403, translation data structure 404, destination data structure 406, optional decision data structure 409, treatment data structure 407, digit collection data structure 405 and default data structure 408.

CPU 304 uses message interface 402 to exchange messages with interface 302. CPU 304 processes the messages from message interface 402 using data structures. A data structure is a logical table that can be entered using information or pointers to yield additional information or a pointer to another data structure. Those skilled in the art will appreciate that CPU 304 could include other data structures but only data structures 404, 405, 406, 407, 408, and 409 are shown for clarity. CPU 304 processes the data structure until the data structure yields either the desired information or a pointer to another data structure.

For example, CPU 304 could enter the translation data structure 404. Translation data structure 404 is used during call processing for digit manipulation, including without limitation, the translation of speed dial numbers and other digit strings passed in messages to CPU 304. The translation data structure 404 matches digits in a message against digits defined in translation data structure 404 and selects a next tree data structure based on the message digits. The message digits could be a speed dial number or digits collected by digit collection data structure 405. The defined digits could be a called party's number, a tree ID pointing to digit collection data structure 405 or a trigger index for the service discrimination process 403.

The digit collection data structure 405 is used to collect digits from a caller and to match or validate the collected digits against defined digits within digit collection data structure 405. The digit collection data structure 405 can yield a pointer to one of the other data structures for additional call processing or generate a query message for message interface 402 with digit collection instructions. The digit collection data structure 405 can yield a pointer to the destination data structure 406, the treatment data structure 407, the default data structure 408, the optional decision data structure 409 or the translation data structure 404.

Digit collection data structure 405 could point to destination data structure 406 for the generation of call handling information. Destination data structure 406 yields a selected switch and connection for the call, and produces an SCP response message with this call handling information for the message interface 402. Digit collection data structure 405 could also point to treatment data structure 407 for the generation of call handling information. Treatment data structure 407 is used to reject calls or apply any treatment for the given call profile. Treatment data structure 407 produces an SCP response message for message interface 402. Digit collection data structure 405 could also point to default data structure 408 for the generation of call handling information. Default data structure 408 is used to provide default connections or handle mistakes in the data structures. Default data structure 408 produces an SCP response message for the message interface 402.

Optional decision data structure 409 is used to apply additional logic to the call as would be appreciated by those skilled in the art. Some examples of such additional logic are data structures for processing the call based on a time of day, II digits, call distribution, or remote processor information. Optional decision data structure 409 points to destination data structure 406, treatment data structure 407 or default data structure 408.

Figure 5:
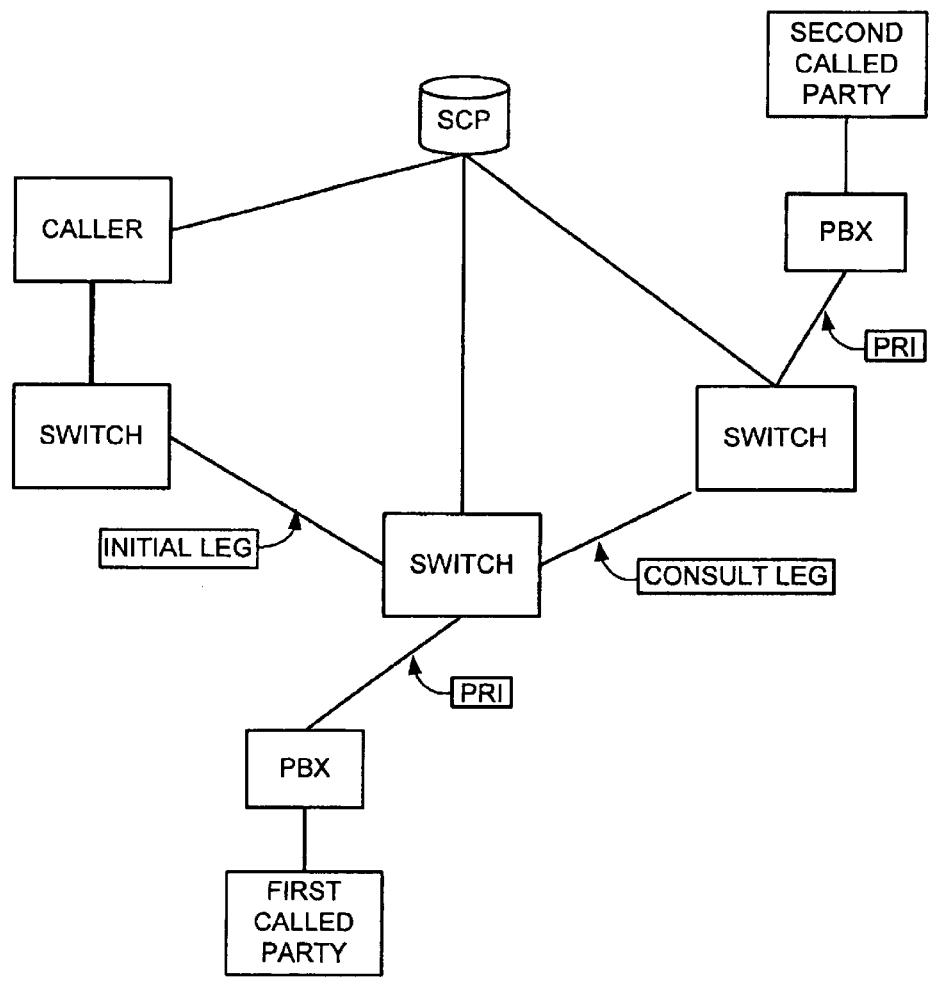
FIG. 5 illustrates a network architecture in an example of the present invention.

Call Redirection:

FIG. 5 illustrates a network architecture in an example of the present invention, but those skilled in the art will recognize numerous other configurations that are applicable to the invention described above. Those skilled in the art will also appreciate how combinations of features described below can be combined with the above-described embodiment.

Call redirection is a feature, which allows an incoming call to be redirected or transferred by the called party to another number. The original call is typically an inbound toll-free call to a dedicated location. The redirect can be a speed dial number, a toll-free number, a Virtual Private Network (VPN) toll-free number or a Plain Old Telephone Service (POTS) number including international numbers.

The redirect is completed by either: 1) transferring the call to another location without ensuring the outcome, an unconfirmed redirection; 2) transferring the call to another location with confirmation of results, a confirmed redirection; or 3) transferring the call to another location with the option of a three-way conference, a consultative redirection.

Example of Call Redirection:

In one example of the present SCP with call redirect, a caller accesses the switch by dialing a toll-free number to a first called party. Once the caller to first called party initial leg call is established and the first called party has answered the call, the terminating primary rate interface (PRI) trunk is monitored for possible call redirection activation. The first called party controls the call redirection by entering a speed dial number ("feature code"). The first called party enters the redirection activation feature code and then the address digits for a second called party. Examples of address digits for the second called party could include without limitation, 6 or 7 digit On-Net, Off-Net or International direct distance calling, a second toll-free number, or a 1, 2, 3, 4, or 5 digit speed dial number.

The consult leg call (call from first called party to a second called party) is extended to second called party. If the first called party drops from the call, the second called party may, if eligible, redirect the call to another called party. At any point where a party receiving a call may has call redirection capability, it is possible for that party to conduct any number of consult leg calls, one after another. Such a consult leg call or further redirect would involve an SCP receiving a fifth message and processing the fifth message to generate a sixth message containing third call handling information.

In another example of the present SCP with call redirect, a caller places a call to a first called party by dialing a special service number. The originating switch launches a query message to the SCP. The SCP returns routing information along with an indicator that defines the first called party's redirection capability. The call is routed through the terminating switch to the called party. The switch sends the appropriate first called party address and Automatic Number Identification (ANI) information to the first called party's PBX. The first called party answers the phone and converses with the caller. The first called party dials the redirect activation feature code. The terminating switch recognizes the feature code and allocates a conference bridge for the call and places the caller on hold. The terminating switch sends a query message to the SCP with the feature code command. The SCP responds in conversation mode directing the switch to collect and return the address digits. The switch connects a receiver to the called party to collect the digits and passes them to the SCP. The SCP processes the collected digits and responds with routing information for the call redirect. The switch extends the call to the second called party and first called party and second called party converse while the caller is on hold.

The first called party then dials the feature code for a conference call and the controlling switch's conference bridge connects the caller, first called party and second called party together. The first called party hangs up and is released from the call and the caller and the second called party converse.

SCP Functionality:

When a caller dials a toll-free number, the SCP returns information related to the called party's redirect capabilities in addition to returning the called party's routing information to the switch. When the switch receives the redirect activation feature code it will have been data-filled to query the SCP with the filed authorization code. The SCP selects a routing tree based on the authorization code and the redirect event. The routing tree causes the collection of digits and returns a route choice for redirection or a treatment to the switch. Because the SCP is controlling digit collection for the redirect leg, the switch cannot provide class of service screening and class of service override. Class of service screening and class of service override are provided by the SCP based on criteria including without limitation, Network Performance and/or time of day. Alternatively, the SCP may collect an override code allowing the completion of a restricted call. On the other hand the SCP may also return to the switch along with a route choice, the information that a class of service screening was encountered but override functionality wasn't performed. This enables the switch to provide for the override.

The SCP is enhanced to provide private speed dial lists and class of service screening and class of service override. The SCP is also enhanced with a redirection field and the redirection type field in the caller information parameter. If the redirection field indicates that redirection is allowed then the redirection type field should contain a valid index into the Redirect Request Information (RDRINFO) table of the switch. This index indicates the type of redirection to perform for the call; either unconfirmed, confirmed, or consultative. If the redirection field is set to disallowed the redirection type field is not used and no call redirection is allowed for the call. If the redirection field is set to in-switch the redirection type field is not used and call redirection is performed based on in-switch logic. These fields have the capability to be defined based on both the dialed number and the destination trunk group.

In addition to having the ability to redirect a caller to a toll-free number, private number, or POTS number, the called party has the ability to enter a speed dial code including 1, 2, 3, 4, or 5 digits followed optionally by an octothorpe (#), instructing the network to dial a pre-defined number. The speed dial number will typically be preceded by the asterisk (*) character. The octothorpe forces a dial timer to expire, resulting in expedited speed dial calls. The customer has one speed dial list for an entire trunk group.

There are two types of speed dial lists. The first list treats any number given that is not in its list. The second passes all numbers, even those not in its list, on for further processing. These choices are necessary for customers to restrict redirection to a speed dial list.

All call redirect enabled trunk groups are data-filled to trigger QueryImmed on the Originate Point In Call (PIC) with a PIC Qualifier of Redirection. Service Discrimination is modified to handle a query with this PIC/PIC Qualifier and the new trigger index. The authorization code passed with this query is used to access a tree whose first data structure is a digit collection data structure configured to collect address digits.

A dedicated trunk group may have several toll-free numbers terminating on it. Some of these toll-free numbers allow redirection and some of them do not. Of those that allow redirection some allow unconfirmed, and some allow another redirection type. Each toll-free number terminating on the trunk group may define its redirect capabilities independent of all other toll-free numbers.

Additionally, toll-free numbers may utilize call processing data structures to terminate to one of several destinations or dedicated trunk groups. Some of these destinations allow redirection and some do not. Of those that allow redirection, some allow unconfirmed redirection and some allow another redirection type. Each destination or dedicated trunk group for a toll-free number may define its redirection capabilities irrespective of all other destinations for that toll-free number. The values for redirection and redirection index that are returned to the switch in the call information parameter are stored in the Terminating Feature Table. It should be noted that the addition of these fields to the Terminating Feature Table requires a conversion of existing Terminating Feature Tables in the SCP.

If a destination data structure does not include a Terminating Feature Table or if its Terminating Feature Table does not contain values for redirection and redirection index, then call processing uses the default values for both fields when filling in the call information parameter. Call processing recognizes whether values are required for redirection and redirection index based on the size of the call information parameter passed in the TCAP query. An eight octet call information parameter indicates that redirection and redirection index values are required. A seven octet call information parameter requires no values for redirection or redirection index.

Treatment Data Structure:

A new message type, "Feature Action," is introduced to the SCP treatment data structure. The SCP uses the existing TCAP response when the treatment data structure encounters a message type condition of feature action and a "treatment value" exists. The response contains a feature action parameter that contains the "treatment value" assigned to the error code. The treatment data structure and error number are treated as a legal next tree and next data structure identifier respectively, for entries in the digit collection data structure and a dialed number data structure.

Digit Collection Data Structure:

The digit collection data structure is the initial data structure encountered in the SCP on a redirect leg query. This data structure is configured in one of two modes. The first mode defines a set of valid number ranges and a default that points to treatment for any numbers not in the ranges provided. This satisfies the restrictive speed dial list requirement. The second mode passes on all numbers received. This is accomplished by the correct definition of number ranges or by defining a default tree ID and next data structure.

The switch receives a call redirect activation feature code from the first called party. The switch connects a receiver to the first called party and launches an SCP query. Through the service discrimination process a routing tree is selected that contains the digit collection data structure as its first data structure. The digit collection data structure causes the SCP to enter conversation mode and requests 1 to 16 address digits from the switch. The switch returns the digits. The digit collection data structure uses these digits to derive a next tree ID and next data structure to generate call routing information for the redirection request. The end result is a TCAP response containing call routing information that the switch uses to terminate the call to the second called party. The collected digits could be a speed dial number, a POTS number, a VPN number, or toll-free number. In addition, the speed dial numbers will translate to either a POTS, VPN or toll-free number. Alternatively the address returned to the SCP could be a feature code that deletes a partially entered redirection number to release the consult leg and revert to a two party call or a feature code that returns to the caller. In either case the SCP returns a feature action parameter as part of the TCAP response to instruct the switch to revert to a two-party call.

Translation Data Structure:

Triggering on the originate PIC and collecting address digits in TCAP conversation mode bypasses translation that is currently done in the switch. Since conversation mode is being used to collect the address digits on the redirect leg, translation is now performed in the SCP requiring the definition of a translation data structure.

Figure 6:
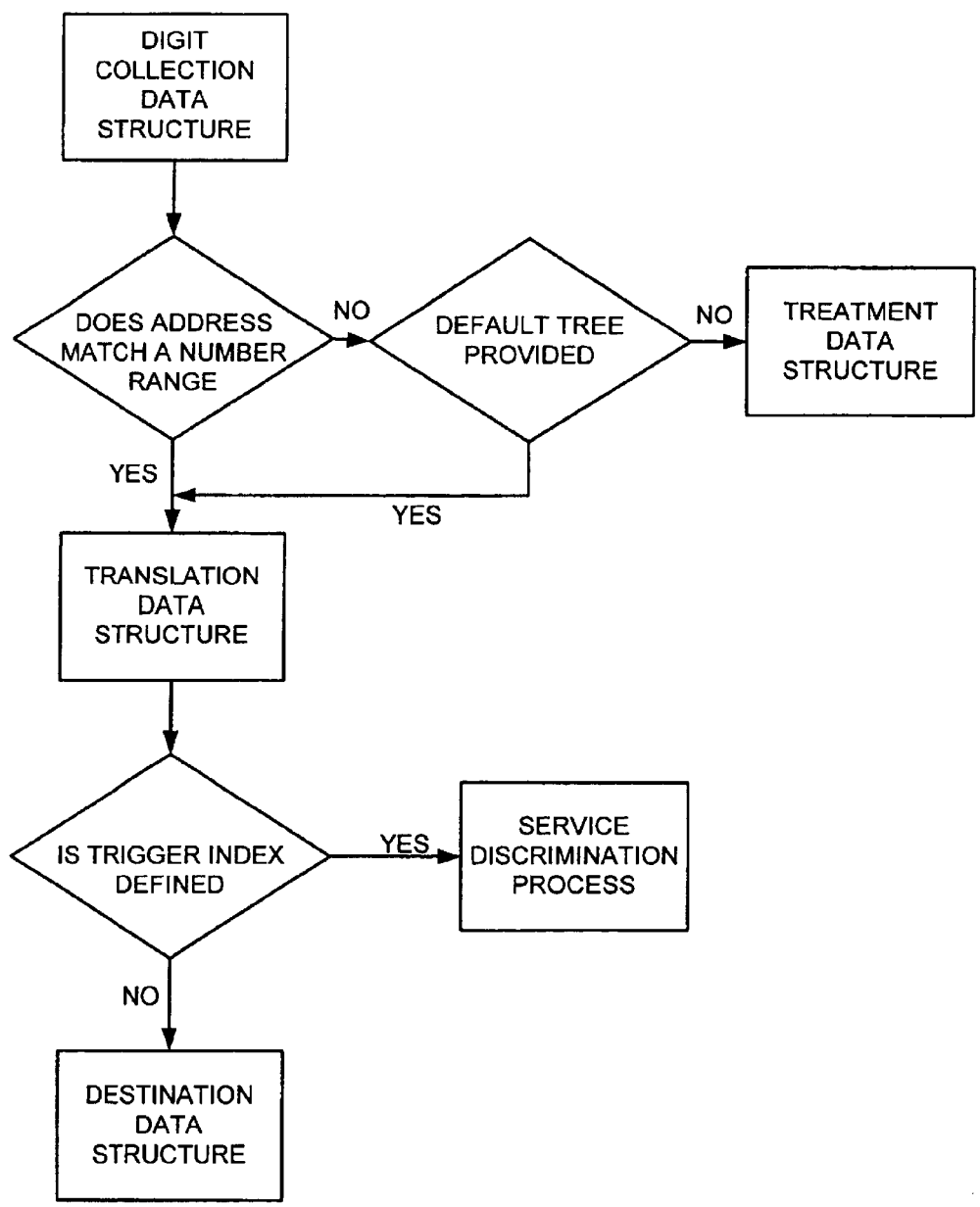
FIG. 6 illustrates a flow diagram of translation data structure processing in an example of the present invention.

Translation provides three key functions. The first of these functions is digit manipulation. This functionality allows the translation of speed dial numbers and may also be used to strip the leading 1 from digits provided through the digit collection data structure process. The second function matches digits against the digits associated to the translation data structure and selects a next tree/initial data structure. This function occurs after any digit manipulation. The third function is the most critical. The third function associates a trigger index with a range of digits defined in the translation data structure. This function then re-invokes service discrimination using the new trigger index as well as any number translation that has been done. Through human error, it may be possible that a number range is defined in the digit collection data structure and points to the translation data structure, but that number range is not present in the translation data structure. When this condition occurs, the SCP uses the treatment data structure to complete the call. FIG. 6 illustrates a flow diagram of the translation data structure processing in an example of the present invention A translation data structure is added to the SCP architecture. The translation data structure provides the data for several functions. Amongst these is translation of speed dial numbers and assignment of trigger indexes. Once translation is done, service discrimination is invoked again taking advantage of the information from the digit collection data structure and the translation data structure. At a minimum each entry in the translation data structure will contain the following information:

| From Digits Range | Up to 16 Digits | The beginning range of the collected number |
| --- | --- | --- |
| To Digits Range | Up to 16 Digits | The ending range of the collected number |
| Delete Digits | Blank, or 0–16 | The number of digits to delete from the collected number. These digits are deleted from the beginning of the dialed number |
| Prefix Digits | Blank, or 0–9999999999999999 | Digits to be prefixed to the collected number. The digits would be prefixed after any digit deletion occurred. |
| Trigger Index | | Trigger Index used to re invoke Service Discrimination. |
| Class of service Encountered | Y/N | Y if class of service screening is defined for this range, N otherwise |
| Call Type | | What is the type of this call (e.g. International, Direct distance dial, On-net) |
| Check class of service override | Y/N | Y if the switch needs to perform the Class of Service Override Check |
| Next Data Structure | | |

Class of Service Screening and Class of Service Override:

Because digit collection on the redirect leg is done in conversation mode and because speed dial translation is done at the SCP, class of service screening and class of service override previously done only at the switch are now done in the SCP. Class of service screening at the switch blocks or allows calls based on several criteria. For example, screening could be based on call type (International, Direct Dial, or On-net), on call type and time of day, or on call type and destination number. Finally screening could be based on call type, time of day and destination number. If class of service override (COSOVE) is allowed then a subscriber exceeding a defined Class or Service (COS) can override the treatment by entering an override authorization code. One skilled in the art will appreciate that COSOVE could be provided both in the SCP and in the switch. If COSOVE is done in the switch, the SCP returns with the routing information a request for the switch to perform the COSOVE. If the switch is requested to perform the COSOVE, a call type is returned with the routing information. If COSOVE is checked at the SCP and fails, the COS treatment is returned to the switch. If COSOVE is checked at the SCP and succeeds the remainder of the routing tree is processed.

Figure 7:
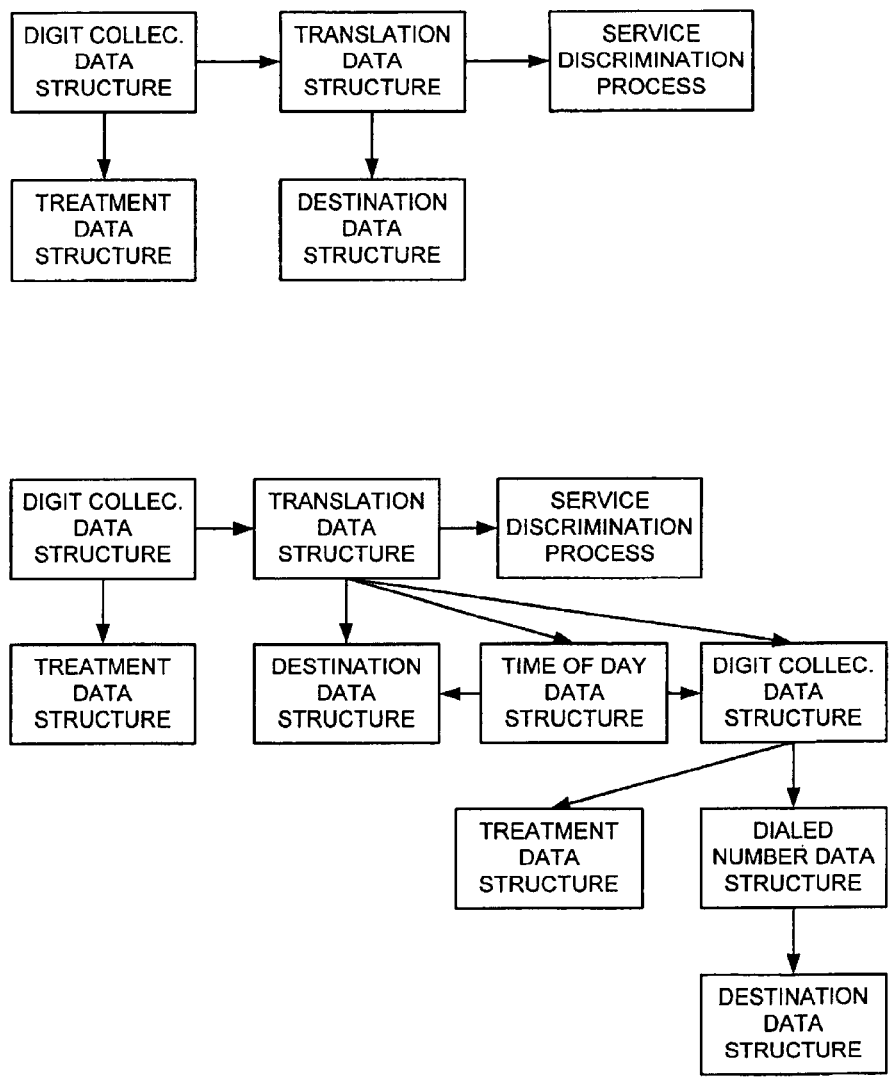
FIG. 7 illustrates a flow diagram of class of service screening and class of service override in an example of the present invention.

As illustrated by FIG. 7, class of service screening and class of service override are provided through the digit range mechanism defined for the translation data structure and the use of other existing data structures including but not limited to, the time of day and the dialed number data structures. In addition, since the SCP doesn't use call type information, defining number ranges in the translation data structure provides the equivalent of screening on call type.

If class of service override is handled in the SCP then another digit collection data structure is the next data structure encountered. Otherwise the switch is told the call type and the following facts: 1) that COS was encountered, 2) that COSOVE wasn't performed, and 3) that COSOVE should be checked. This is the reason for two (2) fields in the translation data structure and one (1) field in the terminating feature table.

TCAP Requirements:

When the SCP is utilized for routing a call, the SCP controls the redirecting capabilities for that call and defines the call redirection rules. The call redirection rules include but are not limited to instructing the switch to allow redirection capabilities for a call, disallow redirection capabilities for a call, or indicate that the switch must use in-switch logic for determining whether call redirection is allowed for the call. This enables the SCP to send an index into table RDRINFO by modifying the TCAP call information parameter. The following rules apply to SCP operation:

1) If the SCP indicates that redirection is to be allowed via the existing redirection field in the call information parameter, then the new redirection index into table RDRINFO provided by the SCP indicates the redirection type to perform for the call.
2) If the SCP indicates that redirection is to be disallowed via the existing redirection field in the call information parameter, then the new redirection index provided by the SCP is not used, and no call redirection is allowed for the call.
3) If the SCP indicates that redirection is to be based on in-switch logic via the existing redirection field in the call information parameter, then the new redirection index provided by the SCP is not used, and call redirection performed by the call is based on in-switch logic.

When the SCP is queried on the redirect leg it goes into conversation mode to collect the address digits. The address digits could be a feature code that deletes a partially entered redirection number to release the consult leg and revert to a two party call or a feature code that returns to the caller. When the SCP sees either of these it instructs the switch to revert to a two party call by returning the feature action parameter. Since the address digits are collected in conversation mode during the redirect leg, it is necessary to implement class of service screening at the SCP. This implementation allows the SCP to request that the switch perform the COSOVE function. The SCP fills a specific field in the destination parameter and includes the miscellaneous parameter in the TCAP response to request the switch perform COSOVE. This enables the SCP to indicate the type of redirection to perform by adding an octet for use in the TCAP call information parameter for TCAP response and query messages. This octet is used to encode the 10 bit redirection index returned from the SCP. In addition an existing octet has 2 bits that indicate whether redirection is allowed or not.

Redirection is a 2-bit field with its least significant bit in bit 6 of octet 4 and its most significant bit in bit 7 of octet 4. The redirection index is 10 bits in length and is encoded beginning with the most significant bit in bit 7 of octet 8 and the least significant bit in bit 6 of octet 7. The SCP directs the switch to revert to a two party call by returning the feature action parameter in the TCAP response message. COS encountered is returned to the switch in an optional miscellaneous parameter as part of the TCAP response. This parameter also contains a COSOVE performed field, which should be set to no if the switch is to perform COSOVE.

SCP Call Detail Records (CDR) Requirements:

Address digits are collected in conversation mode through the use of the digit collection data structure and are fed through a translation process. Likewise, COSOVE may require the collection of a COSOVE code in conversation mode through the use of a digit collection data structure. These digits are written to the SCP CDR using the digits collected field. A digit type already exists for COSOVE and for destination digits. A new digit type with a value of 8 is added to identify speed dial digits in the digit collected field.

The SCP CDR captures the data structures traversed during the processing of a call. The data structures traversed field of the CDR contains the predefined data structure values assigned to each decision and destination data structure. The translation data structure includes a predefined data structure value of 18 that is recorded to the SCP CDR field "data structures traversed" each time the data structure is encountered for a call.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

I claim:

1. A telecommunications system comprising:
   a service control point (SCP) configured to receive a first query for a first call wherein the first query includes a first dialed number associated with a plurality of destinations, process the first dialed number to select a first destination from the plurality of destinations and to determine redirection capabilities for the first destination based upon redirection requirements of the first dialed number, and generate a first query response containing call handling information for the first call including the redirection capabilities for the first destination; and
   a switching system linked to the SCP and configured to transmit the first query to the SCP, receive the first query response from the SCP, and extend the first call from a first calling party to the first destination based on the call handling information for the first call.

2. The telecommunications system of claim 1 wherein the SCP is further configured to receive a redirection message for the call, process the redirection message, and generate a redirection response based upon the redirection capabilities of the first destination, and wherein the switching system is further configured to send the redirection message to the SCP, and receive the redirection response from the SCP.

3. The telecommunications system of claim 1 wherein the SCP is configured to receive a second query for a second call wherein the second query includes a second dialed number associated with the plurality of destinations, process the second dialed number to select the first destination from the plurality of destinations and to determine new redirect capabilities for the first destination based upon redirection requirements of the second dialed number, and generate a second query response containing call handling information for the second call including the new redirection capabilities for the first destination; and
   the switching system configured to transmit the second query to the SCP, receive the second query response from the SCP, and extend the second call from a second calling party to the first destination based on the call handling information for the second call.

4. The telecommunications system of claim 1 wherein the redirection requirements of the first number include allowing the first call to be redirected to a plurality of redirect numbers.

5. The telecommunications system of claim 4 wherein the SCP is configured to process the redirection message including a first redirect number of the plurality of redirect numbers to determine redirection capabilities for a second destination based upon redirection requirements of the first redirect number.

6. The telecommunications system of claim 5 wherein the switching system is configured to receive the redirection response from the SCP and redirect the first call to the second destination.

7. The telecommunications system of claim 1 wherein the switching system is configured to store the redirection capabilities of the first destination.

8. The telecommunications system of claim 1 wherein the redirection response comprises a redirection rejection.

9. The telecommunications system of claim 1 wherein the redirection message comprises a speed dial number.

10. The telecommunications system of claim 1 wherein each one of the plurality of destinations comprises a trunk group for a call center.

11. The telecommunications system of claim 1 wherein the first dialed number comprises a toll-free number.

12. A method of operating a service control point (SCP) comprising:
    receiving a first query for a first call into the SCP from a switching system wherein the first query includes a first dialed number associated with a plurality of destinations;
    processing the first dialed number to select a first destination from the plurality of destinations and determining redirection capabilities for the first destination based upon redirection requirements of the first dialed number;
    generating a first query response containing call handling information for the first call including the redirection capabilities for the first destination; and
    transmitting the first query response to the switching system to extend the first call from a first calling party to the first destination based on the call handling information for the first call.

13. The method of claim 12 further comprising receiving a redirection message for the call from the switching system, processing the redirection message to generate a redirection response based upon the redirection capabilities of the first destination, and transmitting the redirection response to the switching system.

14. The method of claim 12 further comprising:
   receiving a second query for a second call wherein the second query includes a second dialed number associated with the plurality of destinations;
   processing the second dialed number to select the first destination from the plurality of destinations and to determine new redirect capabilities for the first destination based upon redirection requirements of the second dialed number;
   generating a second query response containing call handling information for the second call including the new redirection capabilities for the first destination; and
   transmitting the second query response to the switching system to extend the second call from a second calling party to the first destination based on the call handling information for the first call.

15. The method of claim 12 wherein the redirection capabilities of the first number include allowing the first call to be redirected to a plurality of redirect numbers.

16. The method of claim 15 further comprising processing the redirection message including a first redirect number of the plurality of redirect numbers to determine redirection capabilities for a second destination based upon redirection capabilities of the first redirect number.

17. The method of claim 12 wherein the redirection message comprises a speed dial number.

18. The method of claim 12 wherein each one of the plurality of destinations comprises a trunk group for a call center.

19. The method of claim 12 wherein the first dialed number comprises a toll-free number.

20. A software product for use in operating a service control point (SCP), the product comprising:
   processing system instructions operational when executed by a processor to direct an SCP processing system to process a query for a call having a dialed number to select a destination from a plurality of destinations associated with the dialed number, determine redirection capabilities for the destination based upon redirection requirements of the dialed number, and generate a query response containing call handling information for the call including the redirection capabilities for the destination, and wherein the processing system instructions are further operational when executed by the processor to direct the SCP processing system to process a redirection message for the first call to generate a redirection response based upon the redirection capabilities of the destination;
   interface instructions operation when executed by the processor to direct an SCP interface to receive the query, receive the redirection message, transmit the query response to extend a calling party to the destination, and transmit the redirection response; and
   a storage medium operational to store the processing system instructions and the interface instructions.

* * * * *